(12) United States Patent
Chuang

(10) Patent No.: US 6,505,957 B2
(45) Date of Patent: Jan. 14, 2003

(54) ILLUMINATING APPARATUS FOR A PROJECTION DISPLAY

(75) Inventor: Fu-Ming Chuang, Hsin-Chu Hsien (TW)

(73) Assignee: Prokia Technology Co., Ltd., Tainan Hsien (TW)

(*) Notice: Subject to any disclaimer, the term of this patent is extended or adjusted under 35 U.S.C. 154(b) by 0 days.

(21) Appl. No.: 09/801,907

(22) Filed: Mar. 9, 2001

(65) Prior Publication Data

US 2002/0126500 A1 Sep. 12, 2002

(51) Int. Cl.[7] .................................................. F21V 7/04
(52) U.S. Cl. ........................ 362/268; 362/240; 362/245; 362/247
(58) Field of Search ................................. 362/551, 558, 362/555, 234, 236, 235, 241, 244, 245, 268, 237, 240, 247; 353/1, 6, 16, 33, 34, 37, 38, 99, 8, 122, 98, 20

(56) References Cited

U.S. PATENT DOCUMENTS 4,701,023 A * 10/1987 Hager et al. ............. 250/492.1
4,918,583 A * 4/1990 Kudo et al. .................. 359/619

* cited by examiner

Primary Examiner—Sandra O'Shea
Assistant Examiner—John Anthony Ward
(74) Attorney, Agent, or Firm—Foley & Lardner

(57) ABSTRACT

An illuminating apparatus is adapted to supply input light to a light-processing unit of a projection display, and includes a lighting unit, a lens unit and a light integrator. The lighting unit includes a plurality of lamp bases, each of which is operable so as to generate forwardly directed light rays. The lens unit is adapted to be disposed between the lighting unit and the light-processing unit so as to receive the forwardly directed light rays from the lamp bases. The light integrator has an input side facing the lens unit so as to receive the light rays that pass through the lens unit, and an output side adapted to face the light-processing unit. The light rays that are received from the lens unit are radiated by the light integrator as an evenly distributed light source at the output side for reception by the light-processing unit.

6 Claims, 4 Drawing Sheets

ILLUMINATING APPARATUS FOR A PROJECTION DISPLAY

BACKGROUND OF THE INVENTION

1. Field of the Invention

The invention relates to an illuminating apparatus, more particularly to an illuminating apparatus that is adapted for use in a projection display.

2. Description of the Related Art

In a conventional projection display, light from an illuminating apparatus is split, modulated and subsequently synthesized to form an image on a display screen. A known illuminating apparatus includes a single light source, the light output of which is processed by a condenser, abeam splitter, a polarization converter, etc., of the projection display. In a projection display with a high brightness requirement, the single light source must have a high power rating, which can result in the drawbacks of high temperature and concentration of heat, and in the problem of heat dissipation.

SUMMARY OF THE INVENTION

Therefore, the object of the present invention is to provide an illuminating apparatus that is adapted for use in a projection display and that includes a plurality of light sources so as to be able to provide a high brightness and evenly distributed light output without the high temperature and heat concentration drawbacks commonly encountered in the prior art.

According to the present invention, an illuminating apparatus is adapted to supply input light to a light-processing unit of a projection display, and comprises:

a lighting unit including a plurality of lamp bases, each of which is operable so as to generate forwardly directed light rays;

a lens unit adapted to be disposed between the lighting unit and the light-processing unit so as to receive the forwardly directed light rays from the lamp bases; and a light integrator having an input side facing the lens unit so as to receive the light rays that pass through the lens unit, and an output side adapted to face the light-processing unit, wherein the light rays that are received from the lens unit are radiated by the light integrator as an evenly distributed light source at the output side for reception by the light-processing unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
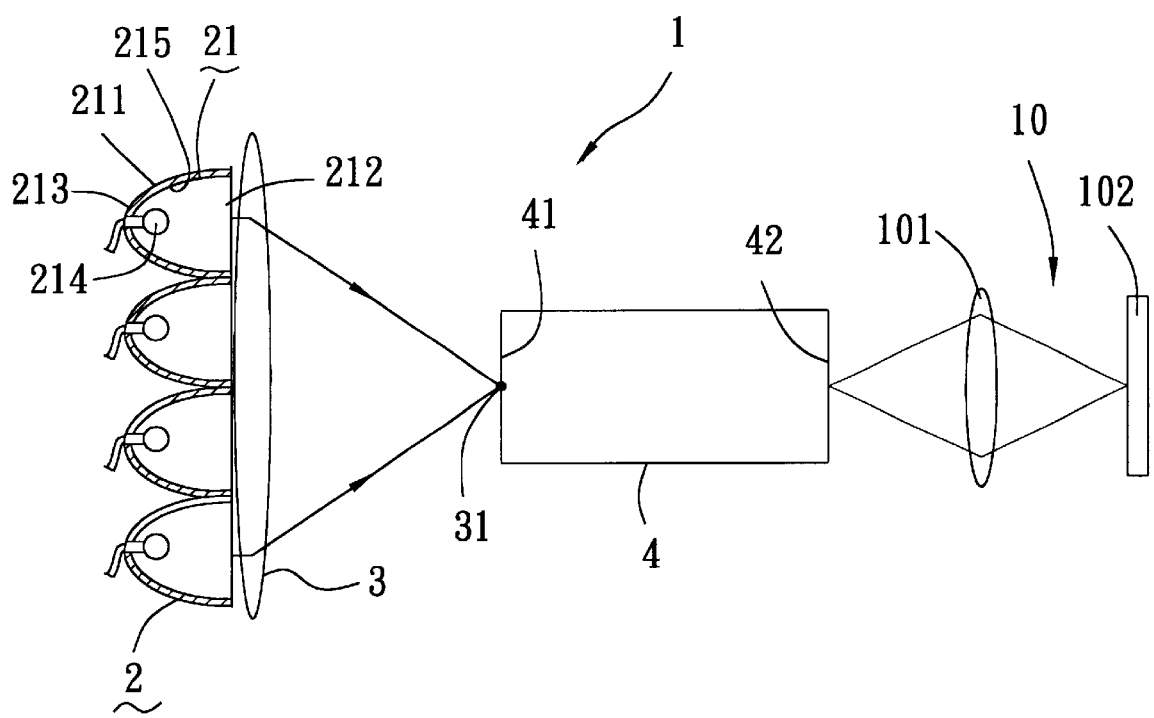
FIG. 1 is a schematic view showing the first preferred embodiment of an illuminating apparatus according to the present invention, and a light-processing unit of a projection display.
Figure 2:
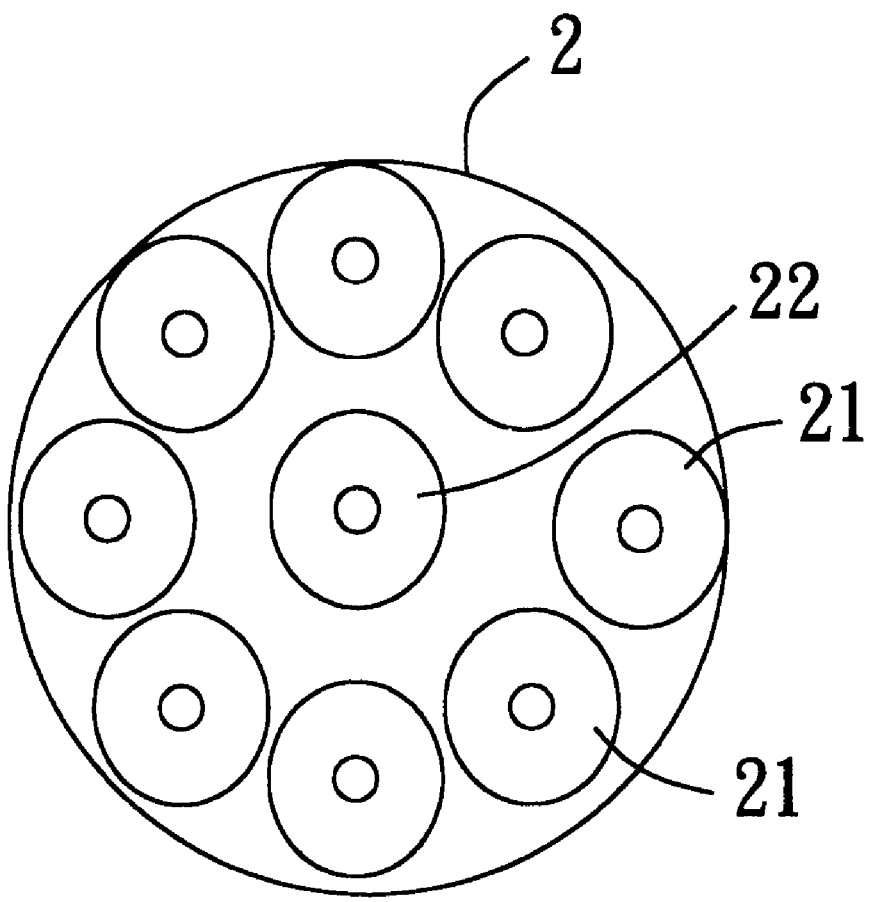
FIG. 2 is a front schematic view of a lighting unit of the first preferred embodiment.

Referring to FIGS. 1 and 2, the first preferred embodiment of an illuminating apparatus 1 according to the present invention is shown to be disposed behind a light-processing unit 10 of a projection display so as to provide input light to the same. In this embodiment, the light-processing unit 10 includes an expansive lens 101 and a light modulator or light valve 102. In actual practice, the light-processing unit 10 can further include other components, such as polarization converters, condensers, beam splitters, etc., which vary according to the required function of the projection display. As the exact configuration of the projection display is known in the art and is not pertinent to the present invention, a detailed description of the same is dispensed with herein for the sake of brevity.

The illuminating apparatus 1 includes a lighting unit 2, a lens unit 3 and a light pipe integrator 4.

The lighting unit 2 includes a plurality of peripheral lamp bases 21 that are equi-angularly disposed in a ring formation, and a central lamp base 22 that is surrounded by the peripheral lamp bases 21. In an alternative embodiment, the lamp bases are equally spaced apart and are disposed in a line formation. Each of the lamp bases 21, 22 includes a parabolic reflector 211. The reflector 211 has an open end 212 that faces the light-processing unit 10, and a lamp-mounting end 213 opposite to the open end 212. Each of the lamp bases 21, 22 further includes a lamp 214 that is mounted in the reflector 211 at the lamp-mounting end 213. The reflector 211 has a reflective inner wall surface 215 such that the light radiated by the lamp 214 will be reflected as forwardly directed parallel light rays that propagate toward the light-processing unit 10.

The lens unit 3 is disposed between the lighting unit 2 and the light-processing unit 10. The lens unit 3 is preferably in the form of a single positive lens, or a lens set that includes a number of lenses. The lens unit 3 causes the parallel light rays that radiate from the lamp bases 21, 22 of the lighting unit 2 to converge at a focal point 31 of the lens unit 3.

The light pipe integrator 4 is preferably in the form of a solid glass rod or a hollow pipe with a reflective inner wall surface. The light pipe integrator 4 is disposed horizontally between the lens unit 3 and the light-processing unit 10. The light pipe integrator 4 has an input side 41 that faces the lens unit 3 and that is coincident with the focal point 31 of the lens unit 3, and an output side 42 opposite to the input side 41 and facing the light-processing unit 10. By virtue of the light pipe integrator 4, light rays that are incident on the input side 41 can be converted into evenly distributed light that is radiated at the output side 42 for reception by the light-processing unit 10.

In view of the above-described construction, a high brightness and evenly distributed light output can be achieved even when the lamps 214 used in the lighting unit 2 have a relatively low power rating. Because the low-power lamps 214 are in use, the heat generated by each of the lamps 214 is relatively small and can be easily dissipated. Furthermore, when any one of the lamps 214 breaks down, the effect thereof will only be a lower brightness output, and will not result in failure of the illuminating apparatus 1.

Figure 3:
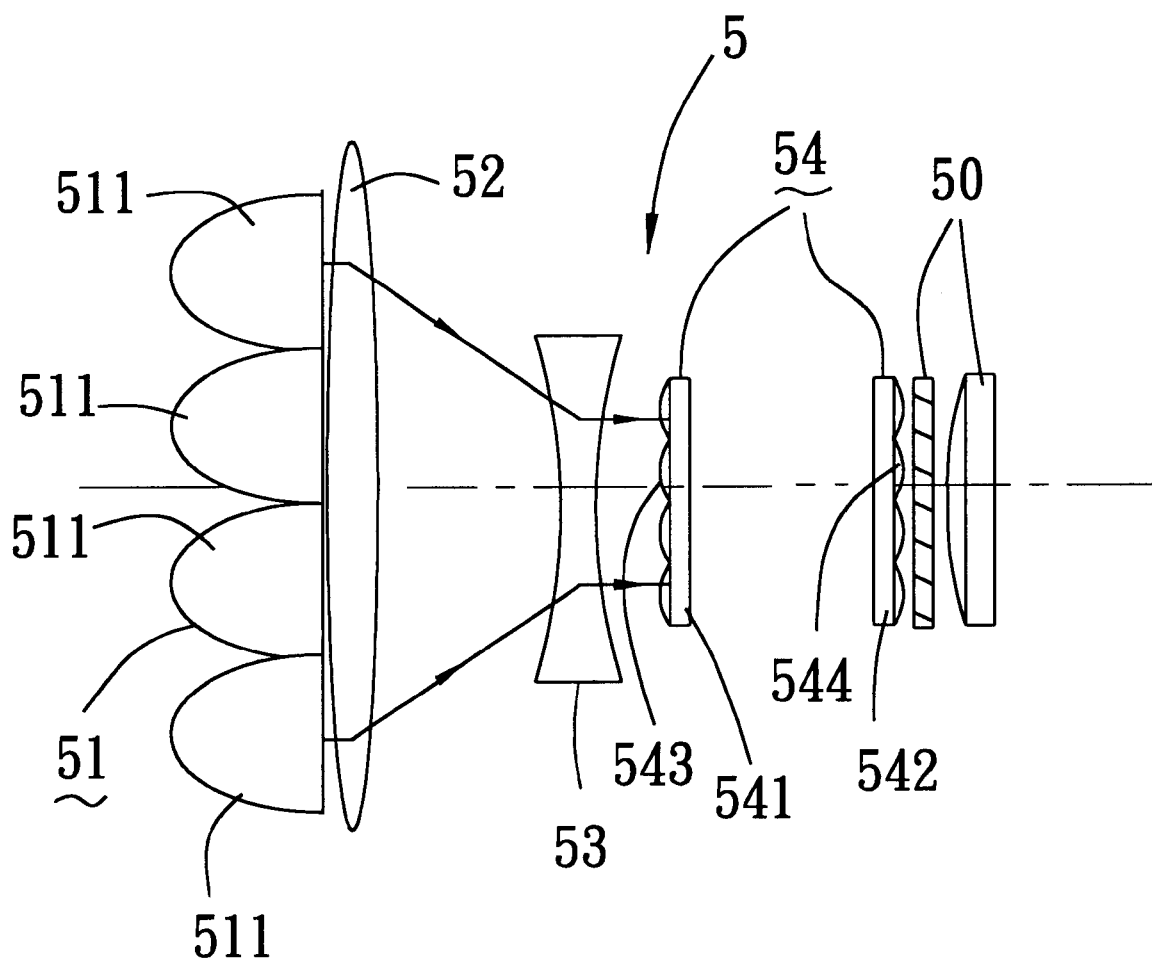
FIG. 3 is a schematic view showing the second preferred embodiment of an illuminating apparatus according to the present invention, and a light-processing unit of a projection display.

Referring to FIG. 3, the second preferred embodiment of an illuminating apparatus 5 according to the present invention is shown to be disposed behind a light-processing unit 50 of a projection display so as to provide input light to the same. The illuminating apparatus 5 includes a lighting unit 51, a lens unit, and a lens array integrator 54.

The lighting unit 51 is similar to the lighting unit 2 of the previous embodiment, and includes a plurality of lamp bases 511 that are operable so as to radiate forwardly directed light rays that propagate toward the light-processing unit 50.

The lens unit is disposed between the lighting unit 51 and the light-processing unit 50, and includes a first lens 52 proximate to the lighting unit 51, and a second lens 53 proximate to the light-processing unit 50. The first lens 52 is preferably in the form of a single positive lens, or a lens set that includes a number of lenses that cooperate to provide positive lens power. The first lens 52 refracts the light rays that radiate from the lamp bases 511 of the lighting unit 51 to result in converging light rays upon exiting the first lens 52. The second lens 53 is preferably in the form of a single negative lens, or a lens set that includes a number of lenses that cooperate to provide negative lens power. The second lens 53 refracts the light rays from the first lens 52 such that the light rays are radiated in parallel upon exiting the second lens 53.

The lens array integrator 54 is disposed between the second lens 53 and the light-processing unit 50. The lens array integrator 54 includes parallel array integrator lenses 541, 542. The array integrator lens 541 has an input side 543 that faces the second lens 53. The array integrator lens 542 has an output side 544 that faces the light-processing unit 50. The lens array integrator 54 cooperates with the first and second lenses 52, 53 of the lens unit such that the forwardly directed parallel light rays from the lamp bases 511 of the lighting unit 51 are converted into an evenly distributed light source that is radiated toward the light-processing unit 50 at the output side 544.

Figure 4:
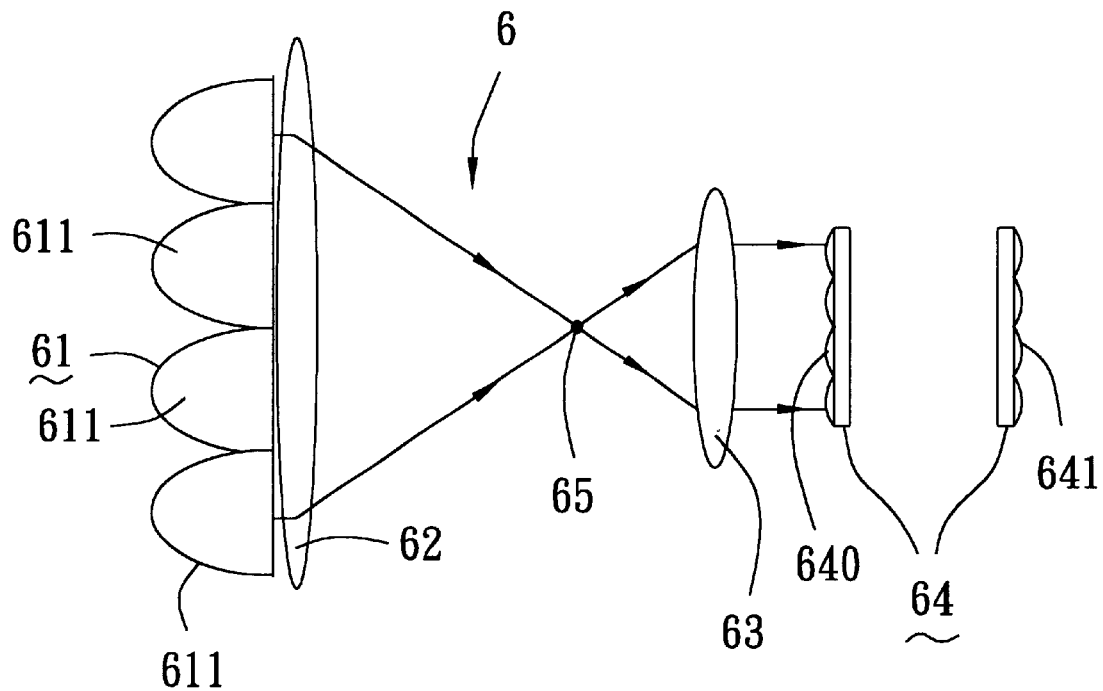
FIG. 4 is a schematic view showing the third preferred embodiment of an illuminating apparatus according to the present invention.

Referring to FIG. 4, the third preferred embodiment of an illuminating apparatus 6 according to the present invention is shown to similarly comprise a lighting unit 61, a lens unit, and a lens array integrator 64.

The lighting unit 61 is similar to the lighting units 2, 51 of the previous embodiments, and includes a plurality of lamp bases 611 that are operable so as to generate forwardly directed light rays.

The lens unit is disposed in front of the lighting unit 61, and includes a first lens 62 proximate to the lighting unit 61, and a second lens 63 in front of the first lens 62. Each of the first and second lenses 62, 63 is preferably a positive lens with a light-condensing capability. The first lens 62 causes the light rays that radiate from the lamp bases 611 of the lighting unit 61 to converge at a focal point 65 behind the second lens 63. The light rays diverge from the focal point 65 as they continue to propagate toward the second lens 63. The second lens 63 causes the light rays that are received thereby to be radiated in parallel upon exiting the second lens 63.

The lens array integrator 64 is disposed in front of the second lens 63 and has a structure similar to that of the lens array integrator 54 of the previous embodiment. Like the embodiment of FIG. 3, the lens array integrator 64 has an input side 640 that receives the parallel light rays from the second lens 63, and an out put side 641 from which an evenly distributed light source is radiated for reception by a light-processing unit (not shown) of a projection display.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An illuminating apparatus adapted to supply input light to a light-processing unit of a projection display, said illuminating apparatus comprising:

a lighting unit including a plurality of lamp bases, each of which is operable so as to generate forwardly directed light rays, and each of which includes a parabolic reflector and a lamp mounted in said reflector;

a lens unit adapted to be disposed between said lighting unit and the light-processing unit so as to receive the forwardly directed light rays from each of said lamp bases; and a light integrator having an input side facing said lens unit so as to receive the light rays that pass through said lens unit, and an output side adapted to face the light-processing unit, wherein the light rays that are received from said lens unit are radiated by said light integrator as an evenly distributed light source at said output side for reception by the light-processing unit;

said lens unit including a positive first lens proximate to said lighting unit, and a negative second lens proximate to said light integrator, said first lens refracting the light rays from said lamp bases to result in converging light rays upon exiting said first lens, said second lens refracting the light rays from said first lens such that the light rays are radiated in parallel upon exiting said second lens;

said light integrator including a lens array integrator adapted to be disposed between said second lens and the light-processing unit.

2. The illuminating apparatus of claim 1, wherein said lamp bases are equi-angularly disposed in a ring formation.

3. The illuminating apparatus of claim 1, wherein said lamp bases are equally spaced apart and are disposed in a line formation.

4. An illuminating apparatus adapted to supply input light to a light-processing unit of a projection display, said illuminating apparatus comprising:

a lighting unit including a plurality of lamp bases, each of which is operable so as to generate forwardly directed light rays, and each of which includes a parabolic reflector and a lamp mounted in said reflector;

a lens unit adapted to be disposed between said lighting unit and the light-processing unit so as to receive the forwardly directed light rays from each of said lamp bases; and a light integrator having an input side facing said lens unit so as to receive the light rays that pass through said lens unit, and an output side adapted to face the light-processing unit, wherein the light rays that are received from said lens unit are radiated by said light integrator as an evenly distributed light source at said output side for reception by the light-processing unit;

said lens unit including a positive first lens proximate to said lighting unit, and a positive second lens in front of said first lens, said first lens causing the light rays from said lamp bases to converge at a focal point behind said second lens and to diverge from the focal point as the light rays continue to propagate toward said second lens, said second lens causing the light rays that are received thereby to be radiated in parallel upon exiting said second lens;

said light integrator including a lens array integrator adapted to be disposed between said second lens and the light-processing unit.

5. The illuminating apparatus of claim 4, wherein said lamp bases are equi-angularly disposed in a ring formation.

6. The illuminating apparatus of claim 4, wherein said lamp bases are equally spaced apart and are disposed in a line formation.

* * * * *